United States Patent
Cinpinski et al.

(10) Patent No.: US 8,047,065 B2
(45) Date of Patent: Nov. 1, 2011

(54) DIAGNOSTIC SYSTEM FOR VALVE ACTUATION CAMSHAFT DRIVEN COMPONENT COMPENSATION

(75) Inventors: Kenneth J. Cinpinski, Ray, MI (US); Craig D. Marriott, Clawson, MI (US); Andrew P. Bagnasco, Plymouth, MI (US); Ronald Jay Pierik, Holly, MI (US)

(73) Assignee: GM Global Technology Operations LLC

( * ) Notice: Subject to any disclaimer, the term of this patent is extended or adjusted under 35 U.S.C. 154(b) by 129 days.

(21) Appl. No.: 12/507,471

(22) Filed: Jul. 22, 2009

(65) Prior Publication Data

US 2011/0016958 A1 Jan. 27, 2011

(51) Int. Cl.
*G01M 15/09* (2006.01)
(52) U.S. Cl. .................................................... 73/114.79
(58) Field of Classification Search ................. 73/114.79
See application file for complete search history.

(56) References Cited

U.S. PATENT DOCUMENTS

| | | | |
|---|---|---|---|
| 5,184,578 A * | 2/1993 | Quinn et al. | 123/90.17 |
| 5,289,805 A * | 3/1994 | Quinn et al. | 123/90.17 |
| 5,529,034 A * | 6/1996 | Sone et al. | 123/90.17 |
| 5,937,806 A | 8/1999 | Lyko et al. | |
| 6,085,707 A * | 7/2000 | Nemoto et al. | 123/90.16 |
| 6,196,174 B1 * | 3/2001 | Wada et al. | 123/90.15 |
| 6,257,184 B1 * | 7/2001 | Yamagishi et al. | 123/90.15 |
| 6,622,675 B1 | 9/2003 | Simpson | |
| 7,063,057 B1 * | 6/2006 | Waters et al. | 123/90.16 |
| 7,077,082 B2 * | 7/2006 | Bloms et al. | 123/90.12 |
| 7,103,468 B2 * | 9/2006 | Wakashiro et al. | 701/110 |
| 7,698,935 B2 * | 4/2010 | Dibble et al. | 73/114.79 |
| 7,712,441 B2 * | 5/2010 | Cinpinski et al. | 123/90.15 |
| 7,783,413 B2 * | 8/2010 | Cinpinski et al. | 701/105 |
| 2003/0213445 A1 * | 11/2003 | Bloms et al. | 123/90.12 |
| 2010/0154526 A1 * | 6/2010 | Cinpinski et al. | 73/114.79 |
| 2010/0269575 A1 * | 10/2010 | Cinpinski et al. | 73/114.41 |
| 2010/0281966 A1 * | 11/2010 | Cinpinski et al. | 73/114.25 |

* cited by examiner

*Primary Examiner* — Freddie Kirkland, III

(57) ABSTRACT

A diagnostic system and method for operating the same includes a pressure monitoring module generating a diagnostic pressure signal and a camshaft driven engine component correction module generating an engine component oil pressure correction signal and generating a corrected diagnostic pressure signal based on the diagnostic pressure signal and the engine component oil pressure signal. The system further includes a diagnostic module generating a failed variable valve lift mechanism signal based on the corrected diagnostic pressure signal.

18 Claims, 4 Drawing Sheets

DIAGNOSTIC SYSTEM FOR VALVE ACTUATION CAMSHAFT DRIVEN COMPONENT COMPENSATION

FIELD OF THE INVENTION

The present disclosure relates to variable valve actuation systems, and more particularly to diagnostic systems for variable valve actuation systems.

BACKGROUND OF THE INVENTION

The statements in this section merely provide background information related to the present disclosure and may not constitute prior art.

Vehicles include an internal combustion engine that generates drive torque. More specifically, an intake valve is selectively opened to draw air into the cylinders of the engine. The air is mixed with fuel to form a combustion mixture. The combustion mixture is compressed within the cylinders and is combusted to drive pistons within the cylinders. An exhaust valve selectively opens to allow the exhaust gas to exit from the cylinders after combustion.

A rotating cam shaft regulates the opening and closing of the intake and exhaust valves. The camshaft includes a plurality of cam lobes that rotate with the camshaft. The profile of the cam lobe determines the valve lift schedule. More specifically, the valve lift schedule includes the amount of time the valve is open (duration) and the magnitude or degree to which the valve opens (lift).

Variable valve actuation (VVA) technology improves fuel economy, engine efficiency, and/or performance by modifying a valve lift event, timing, and duration as a function of engine operating conditions. Two-step VVA systems include variable valve assemblies such as hydraulically controlled switchable roller finger followers (SRFFs). SRFFs enable two discrete valve states (e.g. a low lift state or a high lift state) on the intake and/or exhaust valves.

Referring to FIG. 1, a hydraulic lift mechanism (i.e. a SRFF mechanism) 10 is shown in more detail. Those skilled in the art can appreciate that the SRFF mechanism 10 is merely exemplary in nature. The SRFF mechanism 10 is pivotally mounted on a hydraulic lash adjuster 12 and contacts the valve stem 14 of an inlet valve 16 that selectively open s and closes an inlet passage 18 to a cylinder 20. The engine inlet valve 16 is selectively lifted and lowered in response to rotation of an inlet camshaft 22 on which multiple cam lobes (e.g. low lift cam lobe 24 and high lift cam lobe 26) are mounted. The inlet camshaft 22 rotates about an inlet camshaft axis 28. Although the exemplary embodiment describes the SRFF mechanism 10 operating on the engine inlet valve 16, those skilled in the art can appreciate that a SRFF mechanism may operate similarly on an exhaust valve 30.

A control module transitions a SRFF mechanism from a low lift state to a high lift state and vice versa based on demanded engine speed and load. For example, an internal combustion engine operating at an elevated engine speed such as 4,000 revolutions per minute (RPMs) typically requires the SRFF mechanism to operate in a high lift state to avoid potential hardware damage to the internal combustion engine.

Diagnostics of the cam lift mechanism is important. The force required to open a valve is manifested in the phaser oil pressure. When the SRFF mechanism fails, it is desirable to provide remedial actions to prevent further engine damage. For example, reducing the engine speed may be performed as a remedial action.

One way to monitor the variable lift hardware includes monitoring the pressure waveform within the camshaft phaser. The pressure waveform has a characteristic signature that varies in amplitude and duration consistent with the lift and duration of the valve operating event. The phaser pressure waveform is a direct result of the mechanical torque required to rotate the driven camshaft. Any loads associated with the camshaft may modify the oil pressure signature. One type of load on a camshaft may be a high-pressure fuel pump. Fuel pumps often include a piston having a mass that has a torque that is required to move the high-pressure fuel pump piston mass against a return spring and/or pressurized fuel.

SUMMARY

A diagnostic system for an engine includes a pressure monitoring module that determines a waveform associated with an engine component driven by the camshaft and mathematically subtracts the engine component signal from the diagnostic oil pressure signal.

In one aspect of the disclosure, a diagnostic method includes generating a diagnostic pressure signal, generating an engine component oil pressure correction signal corresponding to an engine component, generating a corrected diagnostic pressure signal based on the diagnostic pressure signal and the engine component oil pressure signal and generating a failed variable valve lift mechanism signal based on the corrected diagnostic pressure signal.

In another aspect of the disclosure, a diagnostic system includes a pressure monitoring module generating a diagnostic pressure signal and a camshaft driven engine component correction module generating an engine component oil pressure correction signal and generating a corrected diagnostic pressure signal based on the diagnostic pressure signal and the engine component oil pressure signal. The system further includes a diagnostic module generating a failed variable valve lift mechanism signal based on the corrected diagnostic pressure signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
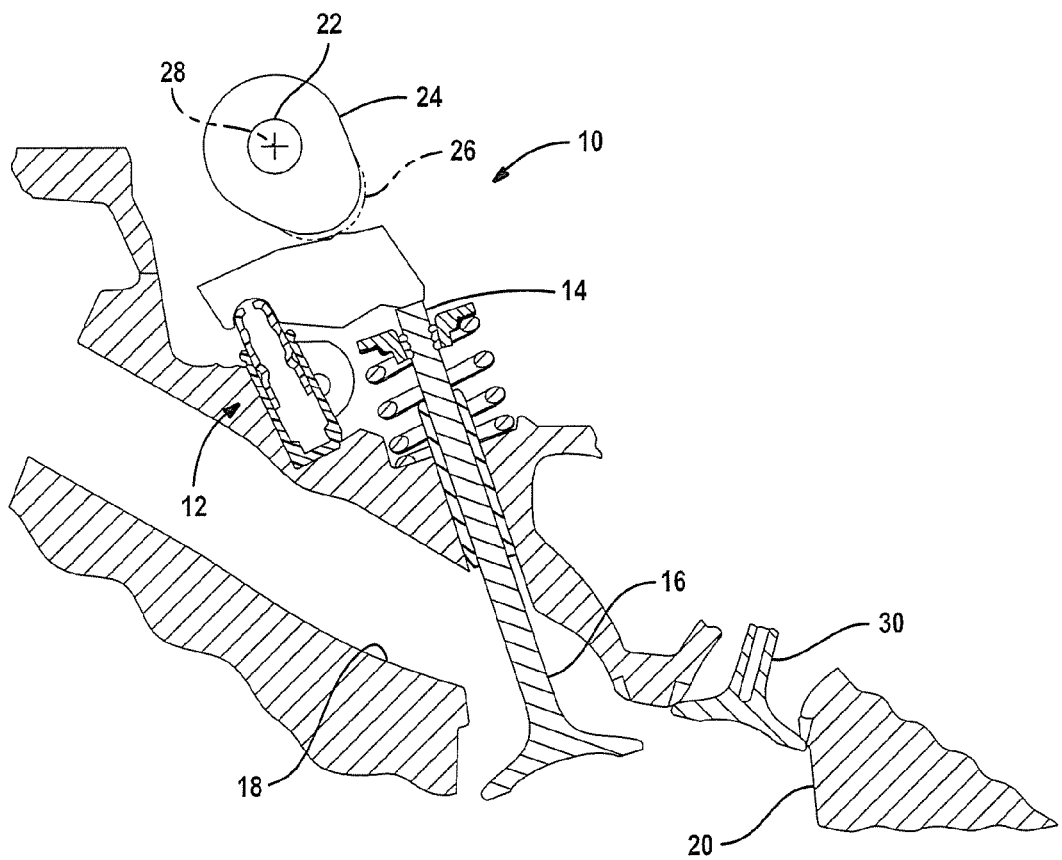
FIG. 1 is a cross sectional view of an exemplary hydraulic lift mechanism according to the prior art.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). It should be noted that low-lift may be no lift or full deactivation. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The example set forth in the present disclosure removes the disturbance associated with a high-pressure fuel pump that is camshaft-driven from a diagnostic oil pressure signal. While a camshaft-driven high-pressure fuel pump is set forth by way of example, other camshaft-driven components may produce disturbances in the diagnostic pressure signature. Therefore, the affect of other camshaft-driven components may also be removed from the diagnostic pressure signal.

Figure 2:
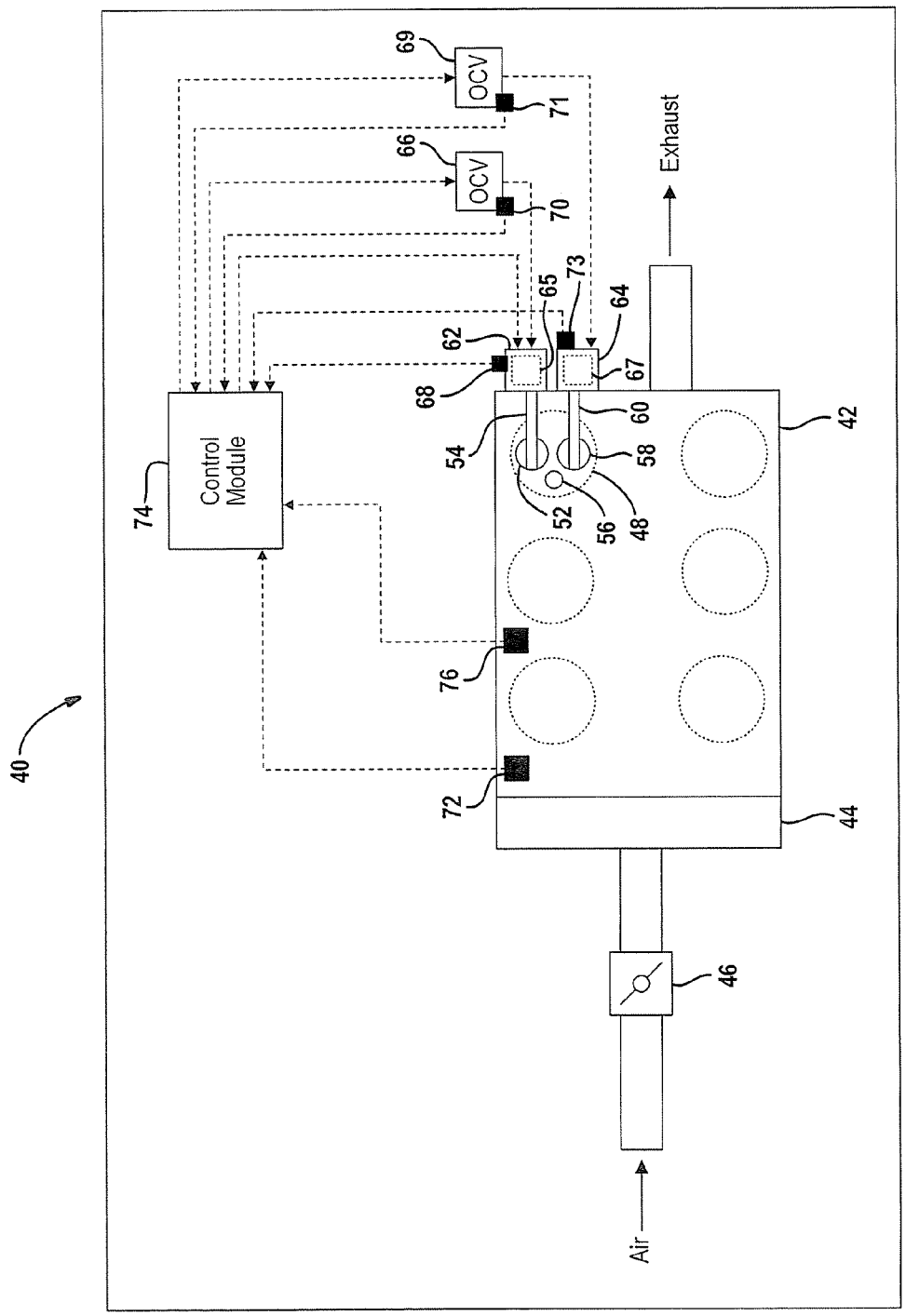
FIG. 2 is a functional block diagram of an exemplary vehicle including a diagnostic system according to the present disclosure.

Referring now to FIG. 2, an engine system 40 includes an engine 42 that combusts an air and fuel mixture to produce drive torque. Air is drawn into an intake manifold 44 through a throttle 46. The throttle 46 regulates mass air flow into the intake manifold 44. Air within the intake manifold 44 is distributed into cylinders 48. Although six cylinders 48 are illustrated, it is appreciated that the diagnostic system of the present invention can be implemented in engines having a plurality of cylinders including, but not limited to, 2, 3, 4, 5, 8, 10, and 12 cylinders.

A fuel injector (not shown) injects fuel that is combined with the air as it is drawn into the cylinder 48 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within each cylinder 48.

An intake valve 52 selectively opens and closes to enable the air/fuel mixture to enter the cylinder 48. The intake valve position is regulated by an intake camshaft 54. A piston (not shown) compresses the air/fuel mixture within the cylinder 48. A spark plug 56 initiates combustion of the air/fuel mixture, driving the piston in the cylinder 48. The piston drives a crankshaft (not shown) to produce drive torque. Combustion exhaust within the cylinder 48 is forced out an exhaust port when an exhaust valve 58 is in an open position. The exhaust valve position is regulated by an exhaust camshaft 60. The exhaust is treated in an exhaust system. Although single intake and exhaust valves 52 and 58 are illustrated, it can be appreciated that the engine 42 can include multiple intake and exhaust valves 52 and 58 per cylinder 48.

The engine system 40 may include an intake cam phaser 62 and an exhaust cam phaser 64 that respectively regulate the rotational timing of the intake and exhaust camshafts 54 and 60. More specifically, the timing or phase angle of the respective intake and exhaust camshafts 54 and 60 can be retarded or advanced with respect to each other or with respect to a location of the piston within the cylinder 48 or with respect to crankshaft position.

In this manner, the position of the intake and exhaust valves 52 and 58 can be regulated with respect to each other or with respect to a location of the piston within the cylinder 48. By regulating the position of the intake valve 52 and the exhaust valve 58, the quantity of air/fuel mixture ingested into the cylinder 48, and therefore the engine torque, is regulated.

The intake cam phaser 62 can include a phaser actuator 65 that is either electrically or hydraulically actuated. Hydraulically actuated phaser actuators 65, for example, include an electrically-controlled fluid control valve (OCV) 66 that controls a fluid supply flowing into or out of the phaser actuator 65. The exhaust cam phaser 64 may include a phaser actuator 67 that is electrically or hydraulically actuated. A fluid control valve 69 controls fluid flowing into or out of the exhaust phaser actuator 67. The exhaust phaser actuator 67 may be controlled by the control module 74. A pressure sensor 71 may generate a pressure of the fluid supplied to the phaser 64. A position sensor 73 may sense the position of the phaser 64.

Additionally, low lift cam lobes (not shown) and high lift cam lobes (not shown) are mounted to each of the intake and exhaust camshafts 54, 60. The low lift cam lobes and high lift cam lobes rotate with the intake and exhaust camshafts 54 and 60 and are in operative contact with a hydraulic lift mechanism such as a switching roller finger follower (SRFF) mechanism as depicted in FIG. 1. Typically, distinct SRFF mechanisms operate on each of the intake and exhaust valves 52 and 58 of each cylinder 48. In the present implementation, each cylinder 48 includes two SRFF mechanisms.

Each SRFF mechanism provides two levels of valve lift for one of the intake and exhaust valves 52 and 58. The two levels of valve lift include a low lift and high lift and are based on the low lift cam lobes and high lift cam lobes, respectively. During "normal" operation (i.e. low lift operation or a low lift state), a low lift cam lobe causes the SRFF mechanism to pivot in a path in accordance with the prescribed geometry of the low lift cam lobe and thereby open one of the intake and exhaust valves 52 and 58 a first predetermined amount. During high lift operation (i.e. a high lift state), a high lift cam lobe causes the SRFF mechanism to pivot in a path in accordance with the prescribed geometry of the high lift cam lobe and thereby opening one of the intake and exhaust valves 52 and 58 to open a predetermined amount greater than the first predetermined amount.

A position sensor 68 senses a position of the cam phaser 62 and generates a cam phaser position signal indicative of the position of the cam phaser 62. A pressure sensor 70 generates a pressure signal indicating a pressure of the fluid supply supplied to the phaser actuator 65 of the cam phaser 62. It is anticipated that one or more pressure sensors 70 can be implemented. An engine speed sensor 72 is responsive to a rotational speed of the engine 42 and generates an engine speed signal in revolutions per minute (RPM).

A control module 74 includes a processor and memory such as random access memory (RAM), read-only memory (ROM), and/or other suitable electronic storage. The control module 74 communicates with the position sensor 68, the pressure sensor 70, and the engine speed sensor 72. The control module 74 may receive input from other sensors 76 of the exemplary vehicle 40 including, but not limited to, oxygen sensors, engine coolant temperature sensors, and/or mass airflow sensors.

The control module 74 ultimately determines a control signal based upon a pressure signal and a correction signal corresponding to a corrected camshaft-driven engine component correction signal. As will be set forth below, a fuel pump is the camshaft-driven fuel engine component. However, the present disclosure may be applied to various camshaft-driven components and is not limited to a fuel pump.

Figure 3:
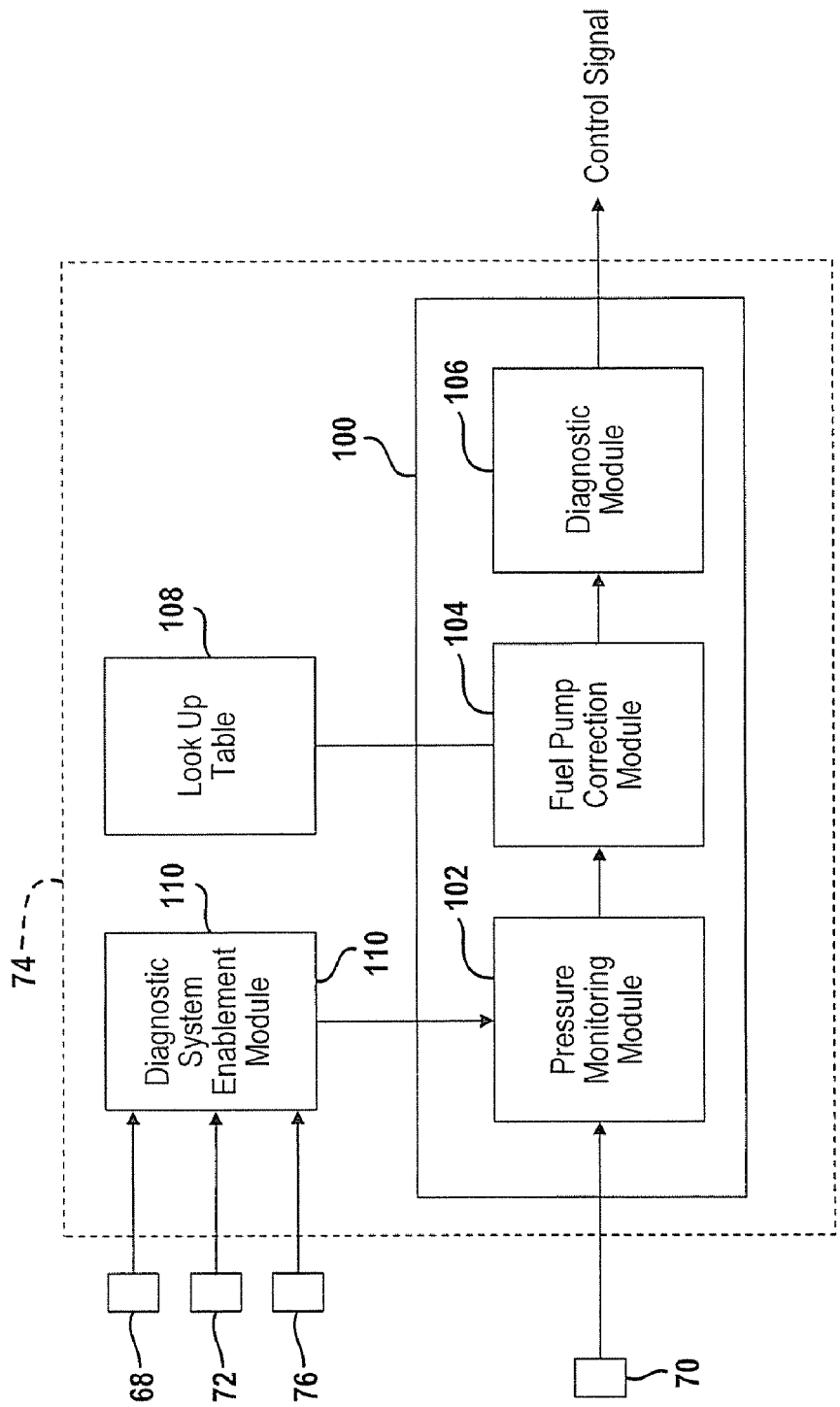
FIG. 3 is a functional block diagram illustrating an exemplary module that executes the diagnostic system of the present disclosure.

Referring now to FIG. 3, the control module 74 is shown in more detail. The control module 74 includes an exemplary diagnostic system 100 of the present invention. The diagnostic system 100 includes a pressure monitoring module 102, a fuel pump correction module 104, a lookup table 108, a diagnostic module 106 and a diagnostic system enablement module 110.

The control module 74 executes a diagnostic system of the present invention. The control module 74 includes a diagnostic system 100 that is used for generating a control signal to control the engine operation or the like. The diagnostic module 100 includes a pressure-monitoring module 102 that monitors a diagnostic pressure signal from the pressure sensor 70. The pressure monitoring module 102 communicates with the pressure sensor 70, the diagnostic system enablement module 110, and the fuel pump correction module 104. The pressure monitoring module 102 monitors pressure variations generated by the fluid supply at the cam phaser 62 that occur while opening each of the intake valves 52 (i.e. operating the SRFF mechanisms) of the cylinders 48. Although the present implementation describes the diagnostic system with respect to the intake valves 52, the pressure monitoring principles of the present disclosure are also applicable to the exhaust valves 58.

The pressure signal may be a diagnostic phaser pressure signal having a signature. The pressure-monitoring module 102 communicates the pressure signal to a fuel pump correction module 104. The fuel pump correction module 104 may receive various signals including an engine-timing signal or a cam-timing signal and generates a fuel pump correction signal and generates a corrected diagnostic pressure signal. The corrected diagnostic pressure signal is communicated to a diagnostic module 106 that compares the corrected diagnostic pressure signal to a threshold or a calibrated diagnostic pressure. By comparing the corrected diagnostic pressure signal and a normal or regular pressure signal, the diagnostic signal may be generated.

The fuel pump correction module 104 may be in communication with a look-up table 108. The look-up table 108 may be stored in the memory of the control module 74 or within the diagnostic module 100. The look-up table 108 may generate a fuel pressure correction signal based upon the speed of the engine or another parameter.

A diagnostic system enablement module 110 communicates with the engine speed sensor 72, the position sensor 68, and other sensors 76. The diagnostic system enablement module 110 determines whether to enable to the diagnostic system 100 by verifying that various enablement conditions are met. The enablement conditions can include ensuring that the engine speed of the engine 42 falls below an engine speed threshold (e.g. 2000 RPM) and that the cam phaser 62 remains in a steady-state operating position. In other words, the diagnostic system enablement module 110 verifies that the engine 42 is operating in a "normal" or low lift state. Those skilled in the art will appreciate that various other enablement conditions are contemplated. If the enablement conditions are met, the diagnostic system enablement module 110 enables the diagnostic system 100.

The diagnostic module 106 communicates with the fuel pump correction module 102. The diagnostic module 106 determines whether a SRFF mechanism associated with one of the cylinders 48 has failed based on the pressure differences. The diagnostic module 106 individually compares each of the pressure differences corresponding to the cylinders 48 to a pressure threshold. In the present implementation, the pressure threshold is approximately 2.5 pounds per square inch (PSI). Other pressure thresholds are anticipated. If the diagnostic module 106 determines that one of the pressure differences is below the pressure threshold, the diagnostic module 106 generates and transmits a failure control signal identifying the cylinder 48 corresponding to the pressure difference (i.e. the pressure difference falling below the pressure threshold). In other words, the diagnostic module 106 identifies a cylinder 48 associated with a SRFF mechanism that has failed to transition from the low lift state to the high lift state. The control module 74 may command remedial action to prevent damage to the engine 42 based on the failure control signal.

Figure 4:
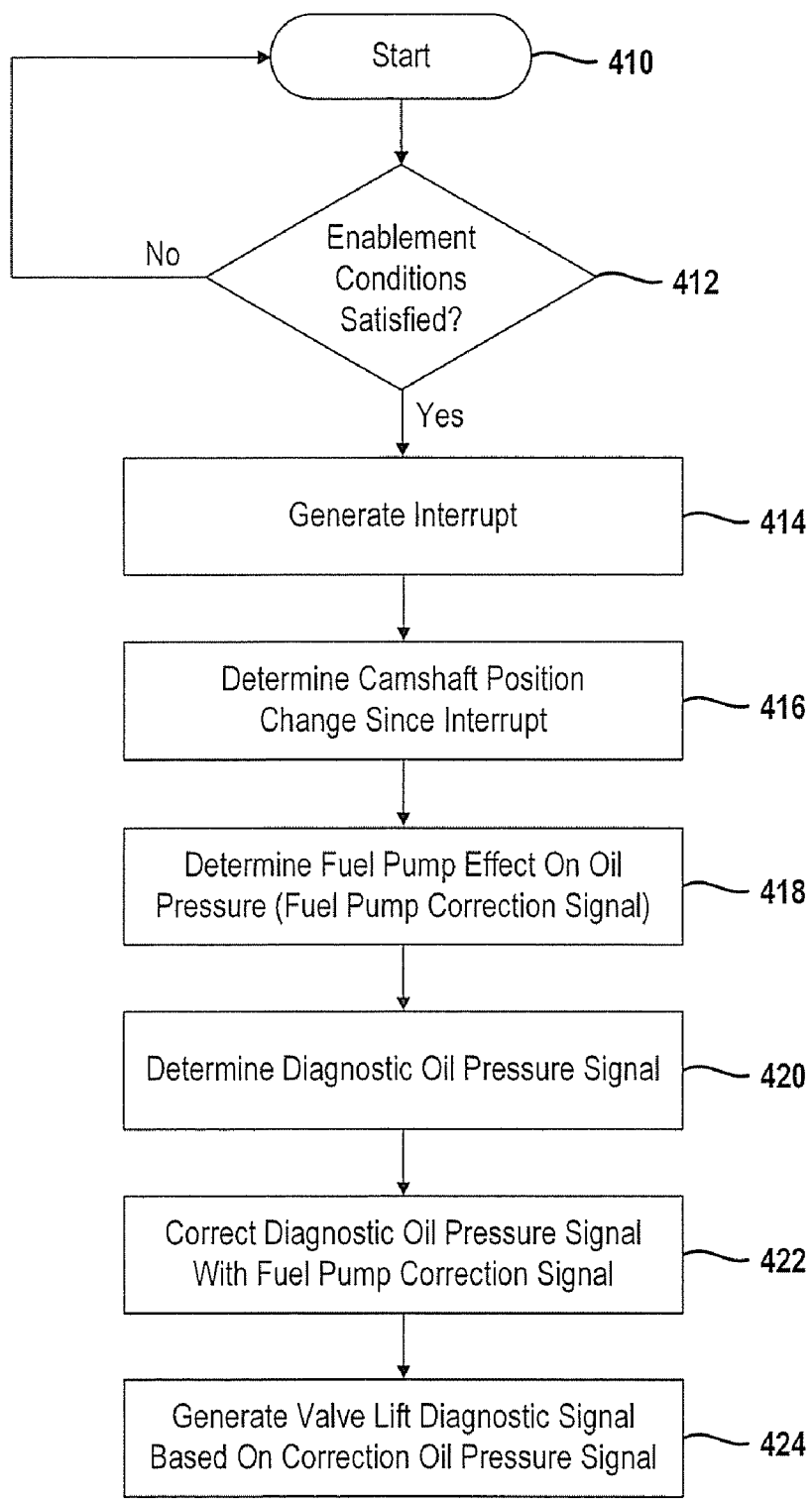
FIG. 4 is a flowchart illustrating a method of operating the diagnostic system of the present disclosure.

Referring now to FIG. 4 an exemplary method 400 for controlling the diagnostic system will be described in more detail. Control begins the method in step 410. In step 412, control determines whether the enablement conditions have been satisfied. If the enablement conditions have not been satisfied, the method proceeds back to step 410. If the enablement conditions have been satisfied, control proceeds step 414.

In step 414, control generates an interrupt that includes a last cylinder identification. The interrupt may be referred to as a last cylinder identification interrupt. In step 416, the camshaft position change since the last interrupt is determined. This is performed since the engine is continually moving.

In step 418, a fuel pump effect on the oil pressure is determined. The fuel pump effect may be manifested in a fuel pump correction signal 418. In the case of another engine component, an engine component correction signal may be generated. The fuel pump effect on the oil pressure may be determined from a look-up table that generates the correction signal based upon the engine speed, and/or other dependencies. At different engine speeds the fuel pump effect may be different.

In step 420, the diagnostic oil pressure signal is generated from the oil pressure sensor. In step 422, the diagnostic oil pressure signal is combined with the fuel pump correction signal to obtain a corrected diagnostic oil pressure signal. The signal may take both the signatures of the diagnostic oil pressure signal and the fuel pump correction signal and mathematically add or subtract the values. Once the effect of the camshaft-driven component, such as the fuel pump, has been removed from the oil pressure diagnostic signal, a valve lift diagnostic signal based on a corrected oil pressure signal is determined in step 424. Step 424 may determine if the corrected oil pressure signal is below a pressure threshold, for example.

It should be noted that the fuel pump effect on the oil pressure, the diagnostic oil pressure signal and the valve lift diagnostic signal may all be based upon the camshaft position and thus based upon each cylinder.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system for an engine, comprising:
a pressure monitoring module generating a diagnostic pressure signal;
a camshaft driven engine component correction module generating an engine component oil pressure correction signal and generating a corrected diagnostic pressure signal based on the diagnostic pressure signal and the engine component oil pressure signal; and
a diagnostic module generating a failed variable valve lift mechanism signal based on the corrected diagnostic pressure signal.

2. The system of claim 1 wherein the camshaft driven engine component correction module comprises a camshaft driven fuel pump correction module generating a fuel pump oil pressure correction signal.

3. The system of claim 2 wherein the diagnostic pressure signal comprises a diagnostic phaser pressure signature.

4. The system of claim 1 wherein the engine component oil pressure correction signal is based on a crankshaft position.

5. The system of claim 1 wherein generating the engine oil pressure correction signal is based on a look-up table.

6. The system of claim 1 further comprising an enablement module that enables the system when at least one enablement condition is met.

7. The system of claim 1 wherein the failed variable valve lift mechanism signal is determined for an intake valve.

8. The system of claim 1 wherein the failed variable valve lift mechanism signal is determined for an exhaust valve.

9. The system of claim 1 wherein the failed variable valve lift mechanism signal is determined for a single roller finger follower.

10. A diagnostic method for an engine comprising:
generating a diagnostic pressure signal;
generating an engine component oil pressure correction signal corresponding to an engine component;
generating a corrected diagnostic pressure signal based on the diagnostic pressure signal and the engine component oil pressure correction signal; and
generating a failed variable valve lift mechanism signal based on the corrected diagnostic pressure signal.

11. The method of claim 10 wherein engine component comprises a fuel pump and the oil pressure correction signal comprises a fuel pump oil pressure correction signal.

12. The method of claim 10 wherein the diagnostic pressure signal comprises a diagnostic phaser pressure signature.

13. The method of claim 10 wherein generating an engine component oil pressure correction signal comprises generating an engine component oil pressure correction signal based on a crankshaft position.

14. The method of claim 10 wherein generating an engine component oil pressure correction signal comprises generating an engine component oil pressure correction signal based on a look-up table.

15. The method of claim 10 further comprising enabling generating a diagnostic signal when at least one enablement condition is met.

16. The method of claim 10 wherein generating a failed variable valve lift mechanism signal comprises generating the failed valve lift mechanism for an intake valve.

17. The method of claim 10 wherein generating a failed variable valve lift mechanism signal comprises generating the failed valve lift mechanism for an exhaust valve.

18. The method of claim 10 wherein generating a failed variable valve lift mechanism signal comprises generating a failed valve lift mechanism for a variable valve lift mechanism having a single roller finger follower.

* * * * *